United States Patent
Kokosky

(10) Patent No.: US 11,813,974 B2
(45) Date of Patent: Nov. 14, 2023

(54) ITEM SECURING DEVICE FOR VEHICLES

(71) Applicant: Edward S. Kokosky, Henderson, NV (US)

(72) Inventor: Edward S. Kokosky, Henderson, NV (US)

(*) Notice: Subject to any disclaimer, the term of this patent is extended or adjusted under 35 U.S.C. 154(b) by 467 days.

(21) Appl. No.: 17/088,569

(22) Filed: Nov. 3, 2020

(65) Prior Publication Data
US 2021/0129735 A1    May 6, 2021

Related U.S. Application Data

(60) Provisional application No. 62/929,940, filed on Nov. 3, 2019.

(51) Int. Cl.
*B60R 7/08* (2006.01)
*B60P 7/08* (2006.01)

(52) U.S. Cl.
CPC .............. *B60P 7/0823* (2013.01); *B60R 7/08* (2013.01)

(58) Field of Classification Search
CPC ............... Y10T 24/314; Y10T 24/4755; Y10T 24/3916; Y10T 24/3936; Y10T 24/3956; F16B 45/00; B60P 7/0823; B60R 2011/0071; B60R 2011/0059; B60R 7/0823; B60R 7/08
See application file for complete search history.

(56) References Cited

U.S. PATENT DOCUMENTS

| | | | | |
|---|---|---|---|---|
| 3,834,061 | A * | 9/1974 | Klein | A01K 91/047 43/44.9 |
| 5,689,860 | A * | 11/1997 | Matoba | F16G 11/101 24/115 F |
| 5,797,167 | A * | 8/1998 | Schwab | F16G 11/143 24/16 R |
| 6,308,383 | B1 * | 10/2001 | Schrader | F16G 11/00 24/598.5 |
| 7,036,189 | B2 * | 5/2006 | Steigerwald | B60P 7/0823 24/265 H |
| 9,528,655 | B1 * | 12/2016 | Miles | F16M 13/022 |
| 9,950,655 | B2 * | 4/2018 | Angara | B60R 13/105 |
| D960,689 | S * | 8/2022 | Li | D8/367 |

* cited by examiner

*Primary Examiner* — Corey N Skurdal
(74) *Attorney, Agent, or Firm* — Newman Law, LLC

(57) ABSTRACT

A device for securing items comprising an attachment member including a rectangular shoulder supporting a hook, a cord extending through the shoulder and a cord securing member an opening to an interior cavity therein for engaging the hook therein.

14 Claims, 5 Drawing Sheets

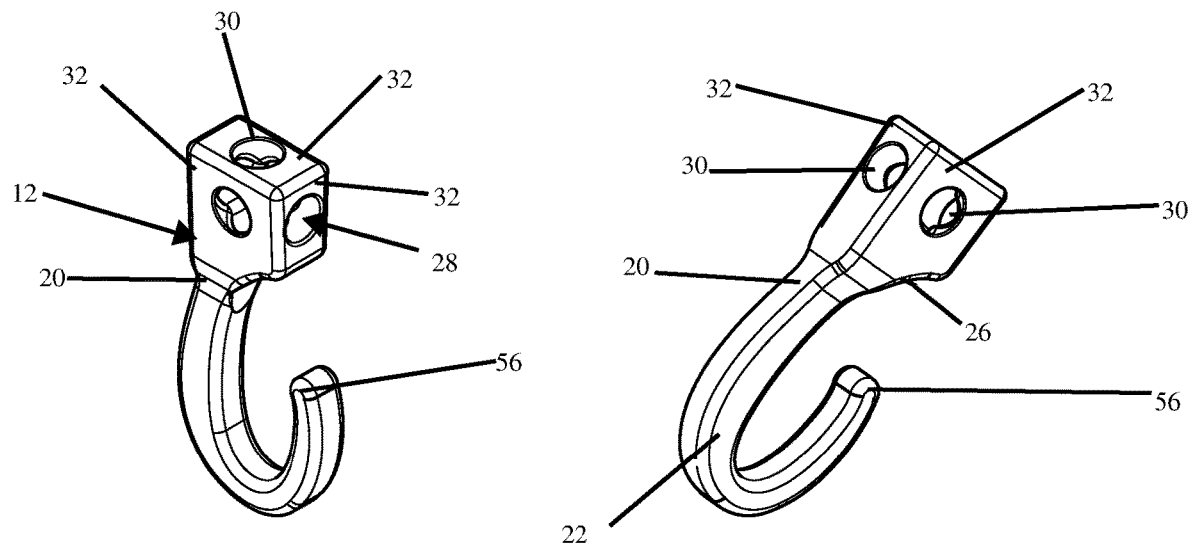

FIG. 4
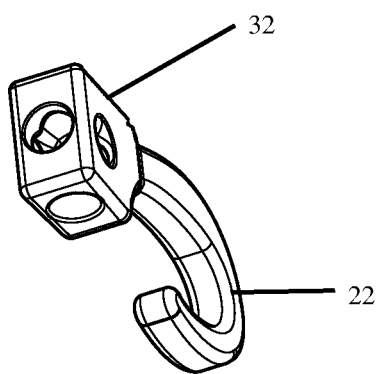 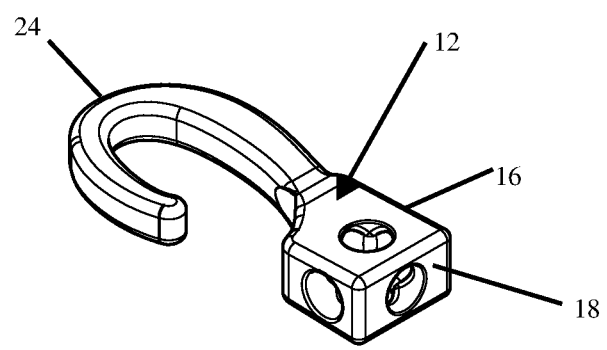
FIG. 5

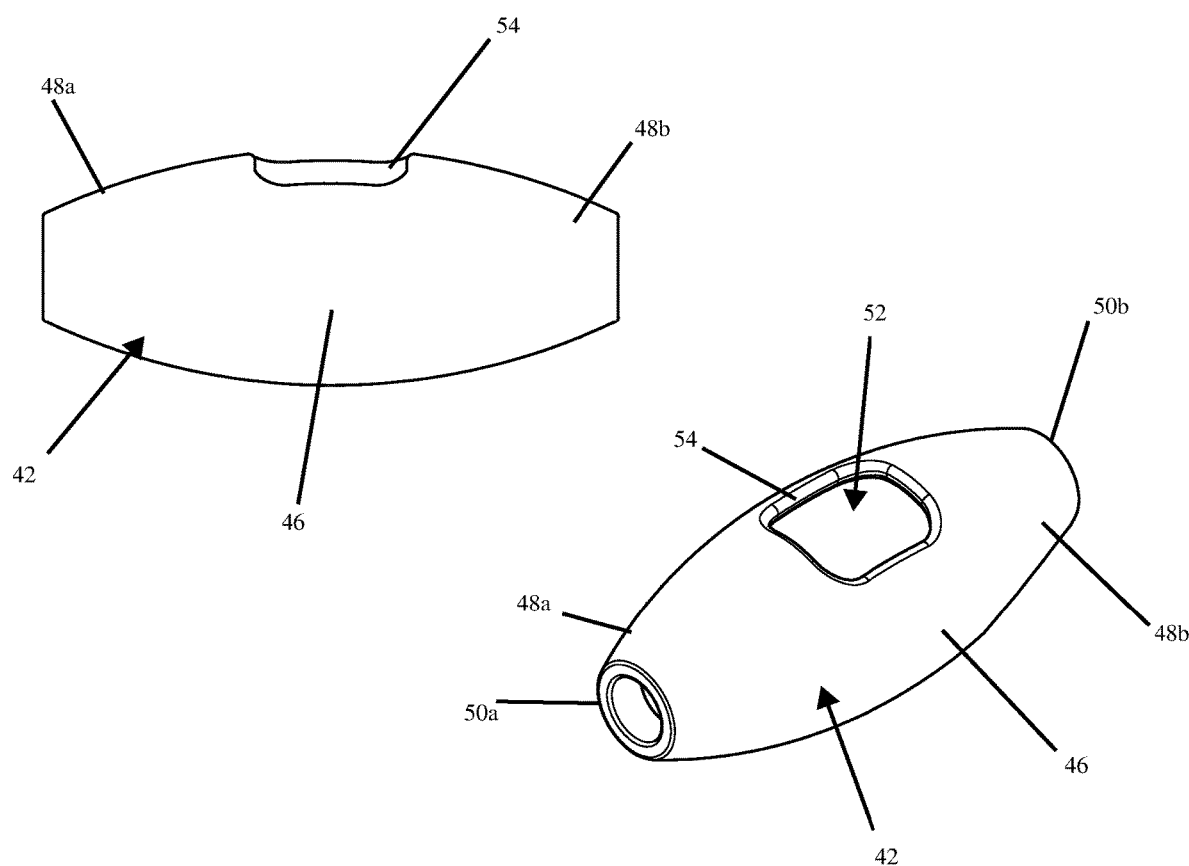

ITEM SECURING DEVICE FOR VEHICLES

CROSS-REFERENCE TO RELATED APPLICATION

This application claims the priority benefit of US provisional patent application No. 62/929,940 filed on Nov. 3, 2019, the disclosure of which is incorporated herein by reference.

FIELD OF THE INVENTION

This invention relates to the stabilization and securing of articles in a vehicle during shipment or transport, and more particularly, devices designed for holding bags having handles when such bags are transported within the main cabin of a vehicle.

BACKGROUND OF THE INVENTION

Shopping or grocery bags, whether plastic, paper or fabric, are widely used by retail establishments and individuals to carry and/or package purchased items. The conventional grocery bag is made of a thin material, such as plastic, with cutouts at the open end to form two handles for carrying the bag. These handles make the bag convenient for carrying items since the handles are readily accessible and the handles of several bags can be gripped together for carrying. Unlike a box or even a standard paper grocery bag, both of which have some degree of rigidity, the conventional plastic grocery bag does not have the ability to maintain any shape apart from the shape of whatever items are placed in the bag. When transported in a vehicle, the items within any bags, including grocery bags, purses and backpacks, may shift position, roll around and come out of the bags. Moreover, the bags themselves, whether plastic, paper, leather or fabric, and regardless of the shape or structure of a bag, are prone to move due to the motion of the vehicle. While some devices exist for securing bags in the trunk of a vehicle, people often prefer or even need for sake of accessibility to have these items secured in the main or passenger compartment or cabin of the vehicle.

Accordingly, what is needed is a device for securing items, such as bags, in a manner which restricts uncontrolled movement of the items within a vehicle while the vehicle is in motion. Further limitations and disadvantages of conventional and traditional approaches will become apparent to one of skill in the art through comparison of described methods and systems disclosed herein.

SUMMARY OF THE INVENTION

The invention is generally directed to a device which resolves the aforementioned issues, among others.

Some embodiments are directed to a device for securing items comprising an attachment member including a support base including a rectangular shoulder at a first end connected by an arm to a hook defined at a second opposing end, the arm extending from a first side of the rectangular shoulder, wherein the shoulder includes an interior cavity with at least two openings on at least two of the other five sides of the rectangular shoulder; an elastic cord extending in the interior cavity through at least two openings, the elastic cord having a first end and a second end; and an elastic securing member including an elongated body, the elongated body having a cavity therein, a central portion and opposing ends, wherein each opposing end includes an opening for receiving the first end and the second end of the elastic cord respectively, wherein the first end and the second end of the elastic cord extend through the opposing openings and form an engagement within the interior cavity of the elongated body, and wherein the elongated body includes an opening to the cavity in the central portion for engaging the hook therein.

In some embodiments, the rectangular shoulder of the aforementioned device includes five openings on each of the other five sides thereof.

In some embodiments, the central portion of the elongated body has a greater diameter than the opposing ends.

In some embodiments, the elongated body comprising opposing tapered ends, wherein each tapered end includes one of the at least two opposing openings to the cavity, wherein the cavity tubular.

In some embodiments the engagement comprises the first end and the second end of the elastic cord being coupled or engaged with one another, such as through the application of adhesive to the first end and the second end, or by the first end and the second end being knotted.

In some embodiments, the interior cavity of the elongated body includes one or more cord engaging members, the cord engaging members comprising locking teeth adjacent to each opening, the locking teeth extending from the interior surface of the elongated body generally away from the respective adjacent opening and towards a center of the interior cavity whereby the first end and the second end become engaged with the locking teeth upon being fed into openings of the cavity and withdrawal of the first end and second end is subsequently inhibited.

Some embodiments of the invention are directed to a device for securing items comprising: an attachment member including a support base, the support base having a rectangular shoulder at a first end connected by an arm to a hook defined at a second opposing end, the hook being connected to the arm at a proximal end and having an arcuate distal end, the arm extending from a first side of the rectangular shoulder, wherein the rectangular shoulder includes an interior cavity with at least two openings thereto defined on at least two of the remaining five sides of the rectangular shoulder; a cord extending in the interior cavity through at least two openings, the cord having a first end and a second end; and a cord securing member including an elongated body, the elongated body having an interior cavity therein, a central portion and opposing ends, wherein each opposing end includes an opening for receiving the first end and the second end of the cord respectively, wherein the first end and the second end of the cord extend through the opposing openings and form an engagement within the interior cavity of the elongated body, the interior cavity within the elongated body having a greater interior diameter in the central portion than the diameter at the opposing ends, and wherein the elongated body includes an opening to the interior cavity defined in the central portion for engaging the distal end of the hook therein.

In some embodiments the rectangular shoulder includes five openings, wherein each opening of the five openings is defined on one side of the remaining five sides of the rectangular shoulder.

In some embodiments the cord has elastic properties.

In some embodiments the opposing ends of the elongated body are tapered.

In some embodiments the engagement of the first end and the second end of the cord comprises the first end and the second end of the cord being coupled to each other.

In some embodiments the engagement of the first end and the second end of the cord comprises the first end and the second end being adhered to each other.

In some embodiments the interior cavity within the elongated body includes a plurality of cord engaging members, with the plurality of cord engaging members comprising locking teeth adjacent to each of the opposing openings, wherein the locking teeth extend into the interior cavity and pointed in the direction of the central portion whereby the first end and the second end become engaged with the locking teeth upon being fed into the respective opposing openings of the interior cavity such that withdrawal of the first end and the second end from the interior cavity is subsequently inhibited.

The invention is also directed to a device for securing items comprising: an attachment member including a support base, the support base having a rectangular shoulder at a first end connected by an arm to a hook defined at a second opposing end, the hook being connected to the arm at a proximal end and having an arcuate distal end, the arm extending from a first side of the rectangular shoulder, wherein the rectangular shoulder includes five openings, wherein each opening of the five openings is defined on one side of the remaining five sides of the rectangular shoulder; a cord extending in the interior cavity through at least two openings, the cord having a first end and a second end and elastic properties; and a cord securing member including an elongated body, the elongated body having an interior cavity therein, a central portion and opposing ends, wherein each opposing end includes an opening for receiving the first end and the second end of the cord respectively, wherein the first end and the second end of the cord extend through the opposing openings and form an engagement within the interior cavity of the elongated body, the interior cavity within the elongated body having a greater interior diameter in the central portion than the diameter at the opposing ends, and wherein the elongated body includes an opening to the interior cavity defined in the central portion for engaging the distal end of the hook therein, wherein the interior cavity further includes a plurality of cord engaging members comprising locking teeth adjacent to each of the opposing openings, wherein the locking teeth extend into the interior cavity and pointed in the direction of the central portion whereby the first end and the second end become engaged with the locking teeth upon being fed into the respective opposing openings of the interior cavity such that withdrawal of the first end and the second end from the interior cavity is subsequently inhibited.

In some embodiments the engagement of the first end and the second end of the cord comprises the first end and the second end of the cord being coupled to each other.

In some embodiments the engagement of the first end and the second end of the cord comprises the first end and the second end being adhered to each other.

In some embodiments the locking teeth are positioned circumferentially about the interior cavity within the elongated body.

In some embodiments the locking teeth extend radially inward with respect to the axis of the elongated body.

In some embodiments there are one or more sets of locking teeth positioned substantially equidistant from one another circumferentially about the interior cavity within the elongated body. The one or more sets of locking teeth may be positioned axially from one another within the interior cavity of the elongated body.

Other features of embodiments of the invention will be apparent from accompanying drawings and from the detailed description that follows.

Yet other objects and advantages of the invention will become readily apparent to those skilled in the art, following the detailed description, wherein various presently preferred and exemplary embodiments of the invention are shown and described. As discussed herein, the invention is capable of other and different embodiments, and its several details are capable of modifications in various obvious respects, all without departing from the scope of the invention. Accordingly, the drawings and description thereof are to be regarded as illustrative in nature, and not as restrictive.

BRIEF DESCRIPTION OF DRAWINGS

These and other aspects of the systems and methods of the invention will become more readily apparent to those having ordinary skill in the art from the following description of an exemplary embodiment of the invention taken in conjunction with the accompanying drawings wherein like reference numerals refer to like parts.

FIGS. 2-5 are perspective views of the attachment member constructed in accordance with the embodiment of the invention shown in FIG. 1;

FIG. 6 is a front view of the cord securing member constructed in accordance with the embodiment of the invention shown in FIG. 1;

FIG. 7 is a perspective view of the cord securing member constructed in accordance with the embodiment of the invention shown in FIG. 1;

DETAILED DESCRIPTION OF THE INVENTION

Figure 1:
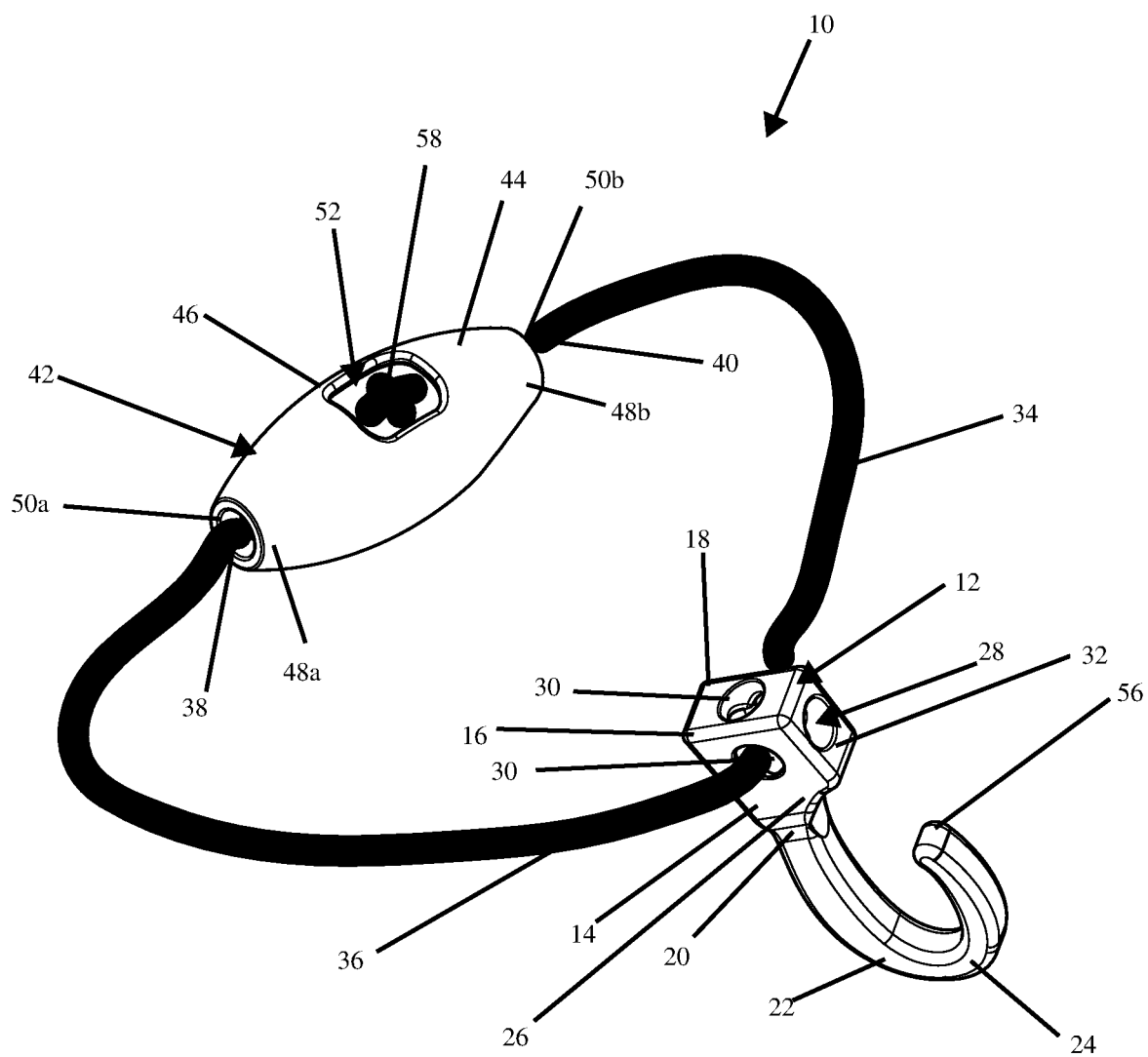
FIG. 1 is perspective view of a device for securing items constructed according to an embodiment of the invention.

The invention is generally directed to an item securing device for use in vehicles. It should be understood that use in vehicles is just one of many possible situations in which an item securing device of the invention may be particularly well-suited, but not intended to be limiting of the potential uses of an item securing device of the invention. For example, it is envisioned that an item securing device of the invention can be used in the home or office.

In some embodiments, the item securing device of the invention includes a hook member extending from a support base and a cord, which may be at least partially constructed of an elastic material to be enabled for stretching, wherein the cord is connected to the support base of the hook. In some embodiments, the support base defines a body including an arm portion with a substantially planar contact surface and a shoulder portion. The shoulder portion includes one or more openings on one or more opposing sides to define one or more channels for receiving the cord, which can be extended through one or more of the channels. In some embodiments, the shoulder portion is in a cubical form. When in use, the cord can be extended through the openings in the shoulder portion, and attached to a post or other projection such as the frame for a headrest in a car. The contact surface of the arm portion can come into contact with a surface of the post, or seat when connected to the headrest, to provide further stabilization of the hook member and any items hung thereon. The cord be at least partially stretchable so as to maintain a tensioned state when the ends of the cord are constrained in a connected position, thus further stabilizing the hook member and any times hung thereon in place.

An exemplary embodiment of a device constructed according to the invention is shown in FIGS. 1-7 and generally referred to by reference numeral 10. Device 10 includes an attachment member 12 including a support base 14 including a rectangular shoulder 16 at a first end 18 connected by an arm 20 to a hook 22 defined at a second opposing end 24. Arm 20 extends from a first side 26 of rectangular shoulder 16. Shoulder 16 includes an interior cavity 28 with five circular openings 30 connecting thereto on each of the other five sides 32 of shoulder 16.

A cord 34 extends through interior cavity 28 and two openings 30. Cord 34 may have elastic properties such that it is flexible and may be stretched from an unstretched condition by a force applied thereto, such as the force of the weight of a bag being hung on hook 22. Cord 34 is also resilient in that it returns to the unstretched condition without being damaged once the applied force is removed thereafter. Cord 34 may be connected to attachment member 12 at a middle portion 36 thereof.

A first end 38 and a second end 40 of cord 34 may be coupled to one another or otherwise secured within a cord securing member 42. Cord securing member 42 includes a generally elongated body 44 which has a central body portion 46 and tapered opposing ends 48a,b. Each opposing end 48a,b includes an opening 50a,b to an interior cavity 52 within elongated body 44 for receiving cord 34 therein. Central body portion 46 includes an opening 54 for receiving the distal end 56 of hook 22 therethrough to interior cavity 52 when device 10 is not in use.

In this embodiment, the internal diameter of cavity 52 is greater than the diameter of openings 50a,b to facilitate an engagement 58 of first end 38 and second end 40 of cord 34 therein and receiving distal end 56 of hook 22 through opening 54. Engagement 58 may involve one or both of tying or adhering with adhesive first end 38 with second end 40.

Figures 8, 9:
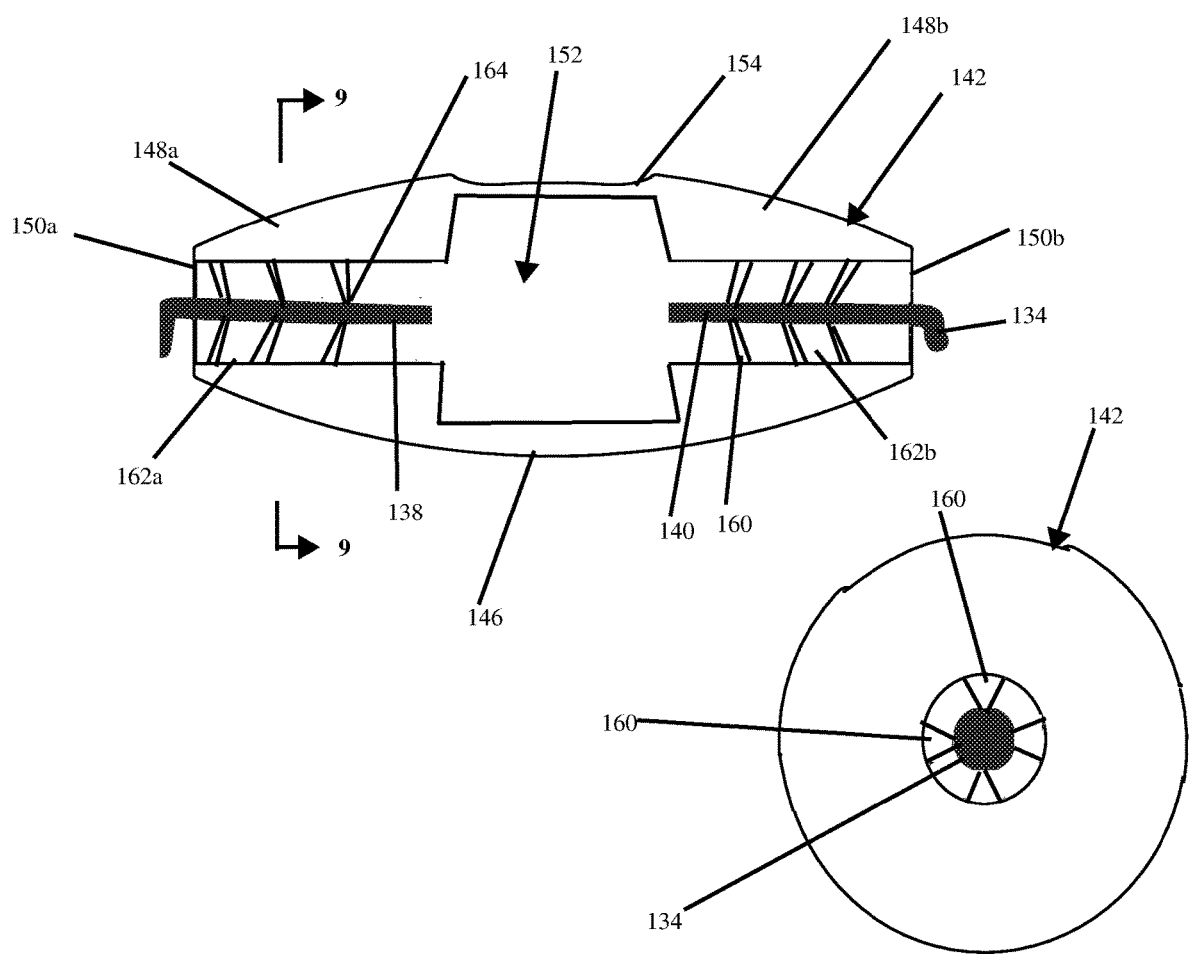
FIG. 8 is a cross-sectional schematic view along the longitudinal axis of a cord securing member constructed in accordance with another embodiment of the invention.
FIG. 9 is a cross sectional view of the cord securing member of FIG. 9 along line 9-9.

Another embodiment of the cord securing member is referred to by the reference numeral 142 in FIGS. 8-9. Cord securing member 142 includes locking teeth 160 which are positioned within interior cavity 152 adjacent to openings 150a,b. Locking teeth 160 are positioned circumferentially about interior cavity 152 and radially with respect to the axis of the cord securing member 142. In this embodiment, three sets of four locking teeth are positioned substantially equidistant from one another circumferentially about the interior cavity 152, with each set being positioned axially from one another within the interior cavity 152. Each of the locking teeth 160 on either interior portions 162a,b adjacent openings 150a,b is angled such that the inwardly extending point 164 is directed towards the central body portion 146. Thus, first end 138 and second end 140 of cord 134 can be fed through openings 150a,b respectively, and engaged by points 164 of locking teeth 160 such that withdrawal of either first end 138 or second end 140 is inhibited.

In an exemplary embodiment, the hook member comprises a urethane hook approximately 2.85 to 3.0 inches in length, about 0.25 to 0.50 inches in width and about 0.33 to 0.75 inches depth. Included and installed is about a 13 inch shock cord with a ball stop connecting and terminating the shock cord. The shock cord's specific length and stretch length supports a perfect install over a standard automobile head rest's metal support posts. The hook support base includes a shoulder portion having multiple holes from every surface plane, except the vertical plane facing the hook end. Each hole can use up to about a 5 mm shock cord. The lateral slide holes can use up to about a 7 mm shock cord. These holes are generally designed to make the hook universal in nature for multiple uses. The hook connects back to the shock cord and fits nicely under the standard headrest out of plain sight until needed.

Un-hook the device of the invention from the stored position and use it to hold plastic grocery bags, such as with a weight of up to for example about 15 lbs on the front seat to keep them from falling on the floor and spilling contents. The hook end has a curved back angle so it may hold different types of bags by the bag handle in single or multiple bag/handle applications.

Other use of the invention are in the pet industry. The hook and shock cord could connect to a animals full upper body harness directly in the middle of the harness for small to medium dogs or cats with a total weight of up to for example about 20 lbs to hold them in the seat.

It should be understood that the aforementioned embodiments of the invention may be of any size or shape.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein and the claims, including equivalents thereto.

The invention claimed is:

1. A device for securing items comprising:
   a) an attachment member including a support base, the support base having a rectangular shoulder at a first end connected by an arm to a hook defined at a second opposing end, the hook being connected to the arm at a proximal end and having an arcuate distal end, the rectangular shoulder having six sides, the arm extending from a first side of the rectangular shoulder, wherein the rectangular shoulder includes an interior cavity with at least two openings thereto defined on at least two of the remaining five sides of the rectangular shoulder;
   b) a cord extending in the interior cavity through at least two of said openings, the cord having a first end and a second end; and
   c) a cord securing member including an elongated body, the elongated body having an interior cavity therein, a central portion and opposing ends, wherein each opposing end includes an opening for receiving the first end and the second end of the cord respectively, wherein the first end and the second end of the cord extend through the opposing openings and form an engagement within the interior cavity of the elongated body, the interior cavity within the elongated body having a greater interior diameter in the central portion than a diameter at the opposing ends, and wherein the elongated body includes an opening to the interior cavity defined in the central portion for engaging the distal end of the hook therein.

2. The device of claim 1, wherein the rectangular shoulder includes five openings, wherein each opening of the five openings is defined on one side of the remaining five sides of the rectangular shoulder.

3. The device of claim 1, wherein the cord has elastic properties.

4. The device of claim 1, wherein the opposing ends of the elongated body are tapered.

5. The device of claim 1 the engagement of the first end and the second end of the cord comprises the first end and the second end of the cord being coupled to each other.

6. The device of claim 1 the engagement of the first end and the second end of the cord comprises the first end and the second end being adhered to each other.

7. The device of claim 1, wherein the interior cavity within the elongated body includes a plurality of cord engaging members, the plurality of cord engaging members comprising locking teeth adjacent to each of the opposing openings, wherein the locking teeth extend into the interior cavity and pointed in the direction of the central portion whereby the first end and the second end become engaged with the locking teeth upon being fed into the respective opposing openings of the interior cavity such that withdrawal of the first end and the second end from the interior cavity is subsequently inhibited.

8. A device for securing items comprising:
   a) an attachment member including a support base, the support base having a rectangular shoulder at a first end connected by an arm to a hook defined at a second opposing end, the hook being connected to the arm at a proximal end and having an arcuate distal end, the rectangular shoulder having six sides, the arm extending from a first side of the rectangular shoulder, wherein the rectangular shoulder includes five openings, wherein each opening of the five openings is defined on one side of the remaining five sides of the rectangular shoulder;
   b) a cord extending in the interior cavity through at least two of said openings, the cord having a first end and a second end and elastic properties; and
   c) a cord securing member including an elongated body, the elongated body having an interior cavity therein, a central portion and opposing ends, wherein each opposing end includes an opening for receiving the first end and the second end of the cord respectively, wherein the first end and the second end of the cord extend through the opposing openings and form an engagement within the interior cavity of the elongated body, the interior cavity within the elongated body having a greater interior diameter in the central portion than a diameter at the opposing ends, and wherein the elongated body includes an opening to the interior cavity defined in the central portion for engaging the distal end of the hook therein, wherein the interior cavity further includes a plurality of cord engaging members comprising locking teeth adjacent to each of the opposing openings, wherein the locking teeth extend into the interior cavity and pointed in the direction of the central portion whereby the first end and the second end become engaged with the locking teeth upon being fed into the respective opposing openings of the interior cavity such that withdrawal of the first end and the second end from the interior cavity is subsequently inhibited.

9. The device of claim 8 the engagement of the first end and the second end of the cord comprises the first end and the second end of the cord being coupled to each other.

10. The device of claim 8 the engagement of the first end and the second end of the cord comprises the first end and the second end being adhered to each other.

11. The device of claim 8, wherein the locking teeth are positioned circumferentially about the interior cavity within the elongated body.

12. The device of claim 11, wherein the locking teeth extend radially inward with respect to the axis of the elongated body.

13. The device of claim 12, further comprising one or more sets of locking teeth positioned substantially equidistant from one another circumferentially about the interior cavity within the elongated body.

14. The device of claim 13, wherein the one or more sets of locking teeth are positioned axially from one another within the interior cavity of the elongated body.

* * * * *